United States Patent [19]
Gregg et al.

[11] Patent Number: 5,613,068
[45] Date of Patent: Mar. 18, 1997

[54] METHOD FOR TRANSFERRING DATA BETWEEN PROCESSORS ON A NETWORK BY ESTABLISHING AN ADDRESS SPACE FOR EACH PROCESSOR IN EACH OTHER PROCESSOR'S MEMORY

[75] Inventors: Thomas A. Gregg, Highland; Robert S. Capowski, Verbank; Frank D. Ferraiolo, New Windsor; Marten J. Halma, Poughquag; Thomas H. Hillock, Woodstock; Robert E. Murray, Kingston, all of N.Y.

[73] Assignee: International Business Machines Corporation, Armonk, N.Y.

[21] Appl. No.: 262,081

[22] Filed: Jun. 17, 1994

[51] Int. Cl.$^6$ .............. G06F 9/24; G06F 12/08; G06F 13/38; G06F 15/16

[52] U.S. Cl. .............. 395/200.13; 395/200.12; 364/DIG. 1; 364/DIG. 2; 370/389

[58] Field of Search .............. 395/200.12, 200.13, 395/800, 200.08, 435, 145, 308, 700, 309, 431, 600, 200.07; 364/DIG. 1, DIG. 2, 409, 408; 370/60, 61.1, 79, 94.1; 340/825.02, 825.44

[56] References Cited

U.S. PATENT DOCUMENTS

| | | | |
|---|---|---|---|
| 4,490,785 | 12/1984 | Strecker et al. | 395/308 |
| 4,611,322 | 9/1986 | Larson et al. | 370/60 |
| 4,730,249 | 3/1988 | O'Quin, II et al. | 395/700 |
| 4,750,109 | 6/1988 | Kita | 395/200.12 |
| 5,125,095 | 6/1992 | Nakazawa et al. | 395/800 |
| 5,148,527 | 9/1992 | Basso et al. | 395/309 |
| 5,230,065 | 7/1993 | Curley et al. | 395/200.08 |
| 5,287,271 | 2/1994 | Rosenbaum | 364/409 |

FOREIGN PATENT DOCUMENTS

486167A2  5/1992  European Pat. Off.

*Primary Examiner*—Daniel H. Pan
*Attorney, Agent, or Firm*—Lynn L. Augspurger; Laurence J. Marhoefer

[57] ABSTRACT

A multi-system interconnect facility in which each central processor complex in the system has an assigned storage space for each other central processor complex in the system for use in communicating with each other central processor complex. The allegiance or association of systems to particular storage spaces is established when each system is initialized and enables a simple interface between user program(s) and message passing hardware consisting primarily of instructions for moving control and data blocks between the program addressable space and the hardware addressable space.

10 Claims, 2 Drawing Sheets

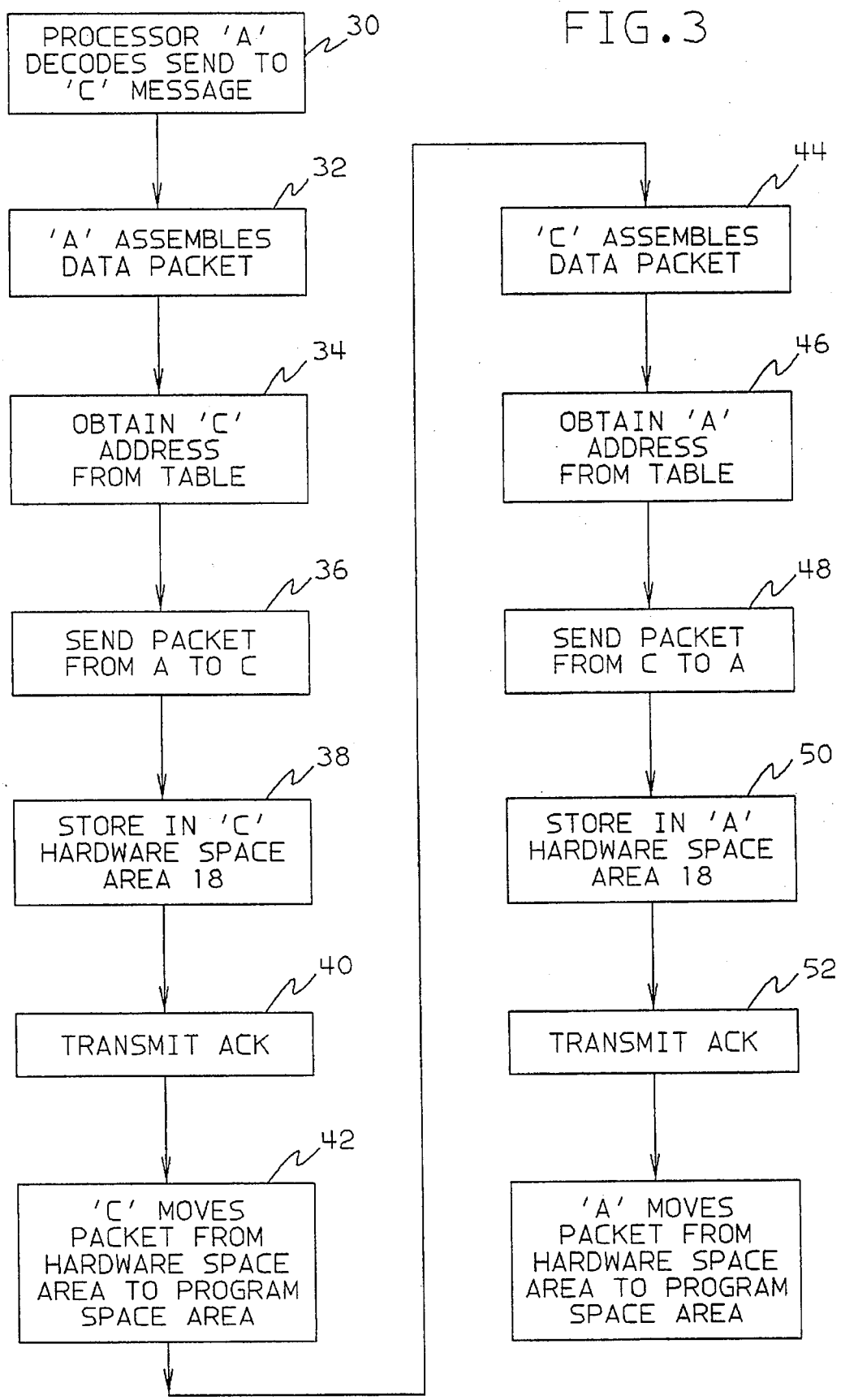

METHOD FOR TRANSFERRING DATA BETWEEN PROCESSORS ON A NETWORK BY ESTABLISHING AN ADDRESS SPACE FOR EACH PROCESSOR IN EACH OTHER PROCESSOR'S MEMORY

BACKGROUND OF THE INVENTION

1. Field of the Invention

This invention relates to a multi-system interconnect facility for providing communications between central processor complexes in a multi-complex network, and more particularly, to a high performance, cost effective interconnect facility for sending and receiving inter-system data.

2. Related Applications

The present United States patent application is related to the following co-pending United States patent application incorporated herein by reference:

Application Ser. No. 08/261,515, filed Jun. 17, 1994, entitled "Self-Timed Interface", and assigned to the assignee of this application.

3. Description of the Prior Art

In a typical prior art multi-system computer network, a channel control element or facility interfaces each computer system to the network or link interconnecting the systems. Each channel control element is coupled to a port interface for a computer system. As will be appreciated by those skilled in the art, the port interface is unique to a particular computer system. The channel control element provides the physical and network (i.e., program) layers required by the link protocol and provides the necessary conversion between the link implementation technology, link speed, and link format and the port interface to a particular computer system. While generally satisfactory, the prior art channel control elements represent a significant portion of the cost of a multi-computer system.

SUMMARY OF THE INVENTION

An object of this invention is the provision of a multi-system interconnect facility that is less costly than those prior art systems that use channel control elements at both the sending and receiving ends of a communications link in a multi-processor system.

Another object of this invention is the provision of a multi-system interconnect facility that improves overall performance by simplifying the number of store and forward, buffering, protocol conversion, and speed matching operations required.

A further object of the invention is the provision of a multi-system interconnect facility which eliminates a requirement that the transmitting system translate external logical address to physical address, facilitates scatter/gather operations, and protects a system program addressable storage area from unauthorized external access.

Briefly, this invention contemplates the provision of a multi-system interconnect facility in which each central processor complex in the system has an assigned storage space for each other central processor complex in the system for use in communicating with each other central processor complex. The assigned storage space may be located in a non-program addressable memory space, referred to herein as the hardware system area (HSA), or in the programmable addressable memory space or parts may be in both programmable and programmed memory space. Storage in the hardware system area provides system security but requires additional data movement as compared to programmable addressable storage which provides less security. The allegiance or association of systems to particular storage spaces is established when each system is initialized and enables a simple interface between user program(s) and message passing hardware consisting primarily of instructions for moving control and data blocks between the program addressable space and the hardware addressable space.

Once established, the correlation between other systems within the multi-system network and HSA storage space (address range) assigned to them is held in each system in HSA tables accessible to the Processor/Licensed Internal Code (licode) within those systems.

A component of the invention is the means for a Processor to launch commands and data to a destination external to the system in which it resides. In the prior art, a channel facility is employed to accomplish this function, acting as an agent or proxy of the Processor. In one embodiment of this invention, in lieu of a channel element, a Pager facility within a Storage Control (SC) initiates the launch, acting as the Processor proxy. In another embodiment of the invention a link Port initiates the launch acting as the Processor proxy. In the preferred embodiment, giving maximum performance, the Processor initiates the launch itself, with the Port providing forwarding services in support.

Another component of the invention, common to all three launch component embodiments, is the link Port function. Each link Port forwards send and receive information packets in essentially the same way. In the first and in the preferred launch component embodiments, packets to be launched onto the link are transferred to the Port (accompanied by command type and destination address in the target system HSA) by the issuing Processor (or Processor proxy). The Port interprets the command and forwards the packets(s) over the link, performing the necessary speed matching required using conventional buffering techniques. In like manner, commands in packets received over the link are interpreted by the receiving Port, and the data in the packet (if it is a store operation) is forwarded through the SC to the HSA address designated in the packet.

In the second launch embodiment, packets to be launched are not provided to the Port but are fetched from storage by the Port.

In the case of large data transfers, consisting of multiple packets, a local pacing protocol between send Port and packet provider (Processor or proxy) prevents Port overrun conditions from occurring. A Port signal, indicating Port buffer availability, is tested by the packet provider prior to sending a next packet to the Port.

An additional component of the invention is the inter-system message protocol level below that of the program level. The program level is assumed to take a conventional form of a control block transfer from sender to receiver followed by a receiver to sender transfer of a control block in acknowledgement. The preferred embodiment of the next lower level protocol includes receipt of an acknowledgement (ack) for each storage access and the forwarding of the ack back to the original initiator of the storage access. This enables initiators (Processors or proxies) to properly pace the launch rate of successive packets in multiple packet transmissions and to determine completion/status of single and multiple packet transfer operations. Unsuccessful packet transfers are retransmitted by the initiator.

Pacing of packet launches during multiple packet transmissions is accomplished as follows: Each send Port is equipped with 'n' packet buffers and each receive Port is equipped with 'm' packet buffers. During multiple packet transmissions, the initiator/packet provider provides the send Port up to (n+m) packets (paced by the local pacing protocol earlier described) without dependence on receipt of successful store acknowledgements and continues to provide subsequent packets at a rate no greater than the rate of receipt of acknowledgements.

The protocol additionally provides means to alert the recipient Processor when message packets have been received and stored in their allocated HSA locations. One embodiment of alerting the Processor of packet arrival in its HSA is the Port capability to store into a designated HSA location which the Processor licode periodically polls. The preferred embodiment for minimum latency is Port capability to directly interrupt the Processor via activation of an interrupt signal line to set a Processor interrupt request latch.

In the preferred embodiment a high efficiency network of computer systems is interconnected via a self timed interface described in co-pending application Ser. No. 08/261,515, filed Jun. 17, 1994, and assigned to the assignee of this application which is a point to point, full duplex, peer to peer communication link.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a flow diagram illustrating the steps in transferring data between central processor complex A and central processor complex C of FIG. 1.

DETAILED DESCRIPTION OF A PREFERRED EMBODIMENT OF THE INVENTION

Figure 1:
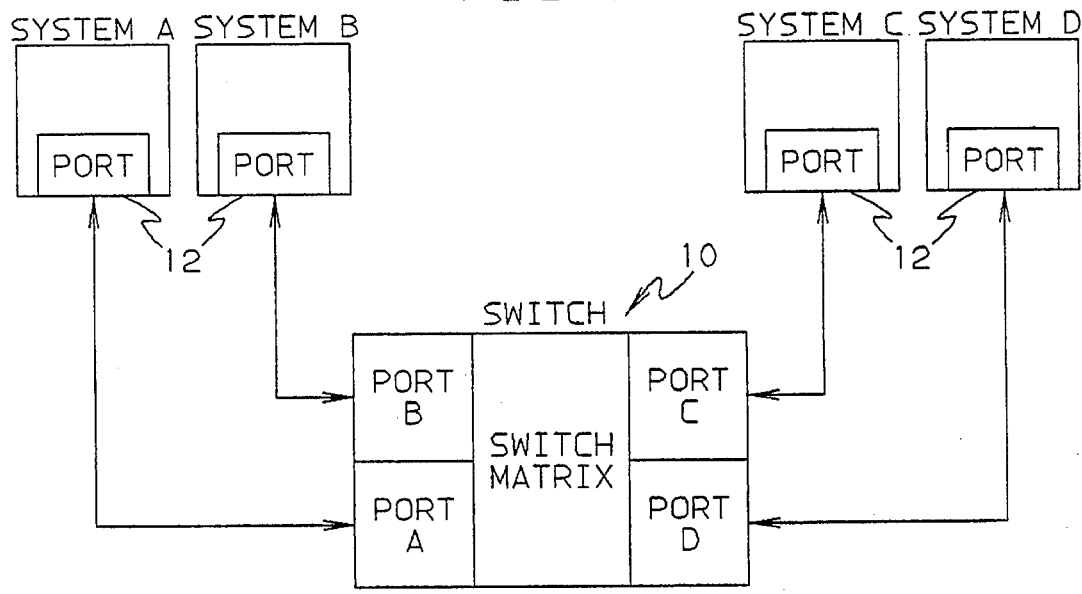
FIG. 1 is a block diagram illustrating an exemplary embodiment of the invention in which four central processor complexes are interconnected in a multi-processor network via a matrix switch.

FIG. 1 shows four systems (System A; System B; System C and System D) interconnected through a four port switch 10. Each system contains a port 12 that is connected to the switch 10. Of course, more systems could be interconnected through a larger switch and each system could have more than one port, but we have limited the number of systems to four and the number of ports to one for the ease of illustrating the concepts. Similarly, the systems could be directly interconnected rather than interconnected through a switch.

A message is sent from one system to another, and the system receiving the message returns a response or acknowledge. The system sending the message is called the sender, and the system receiving the message is called the receiver. Any system can be both a sender and receiver at the same time. The portion of the port sending a message or response is called the sending hardware, and the portion of the port receiving the message or response is called the receiving hardware.

Figure 2:
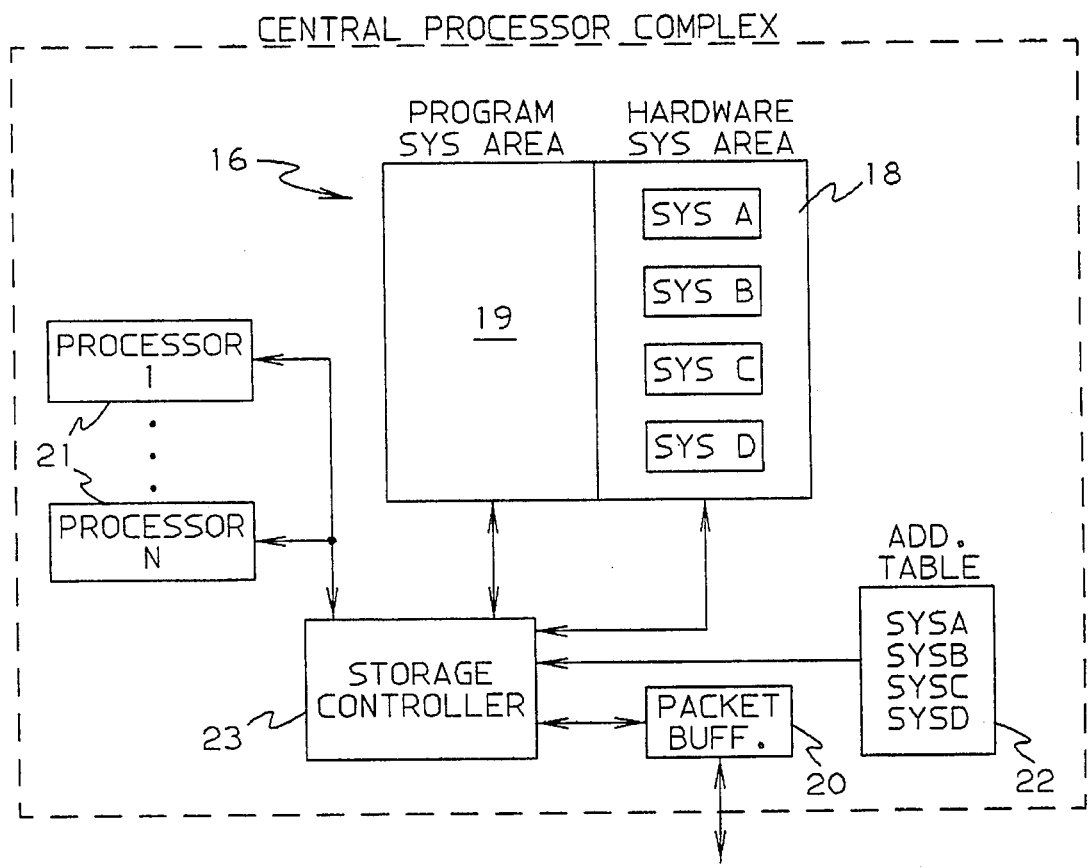
FIG. 2 is a block diagram of one central processor complex in the multi-processor network of FIG. 1.

Details of each system are shown in FIG. 2. Each system has a main memory 16 and within memory 16 there is a hardware system area 18 that cannot be addressed by the operating system program and a program system area 19 that can be so addressed. The central processor complex may include from one to "N" processors 21 which store and read data from memory 16 via storage controller 23. In the hardware system area 18, there are four dedicated message areas (SYS A through SYS D AREA) that are used to communicate with other systems, and even with itself. For example, system A has an area to communicate with systems B, C and D. System A also has an area to communicate with itself. Within each area there are at least four buffers that are used to send a message, receive a response, receive a message, and send a response; four buffers are required for full duplex communication.

The port 12 within each system contains a number of packet buffers 20 and is required to keep data transfer moving on the interface to the switch. The port 12 also contains a table of addresses 22 that specifies hardware area addresses for the various attached systems. When a message or response is received from the switch 10, the source address in the message or response is an index into the address table to determine the location of the area for the system specified by the source address. The address table has two advantages. First, it allows the system to arrange data in its hardware area without knowledge of this arrangement to the other interconnected systems. Second, and more importantly, it allows a particular system to write into only a specific part of the hardware area, and prevents it from writing over areas that it is not supposed to access. When multiple systems are interconnected, one of the goals is higher availability. And to achieve higher availability, every effort is made to keep failing systems from corrupting the entire group of interconnected systems.

The switch 10 is preferably a non-blocking packet switch. Each packet may be an entire message or response, or only a block (or piece) of the message or response. As a packet goes through the switch, a connection is made through the matrix, and after transmission of the packet has finished, the switch matrix connection is broken.

Each packet sent through the switch contains a destination and source address. For example, a packet sent from system A to system B has a destination address of B and a source address of A. The mapping from the addresses in the packets to the physical ports of the switch could be either through a lookup table in switch 10 (not shown) or it could be hard wired in the switch 10. The lookup table provides more configuration flexibility, but it must be initialized.

To augment the advantages offered by the address table in the system port, the switch does not need to forward the source addresses in the packets, but rather generates them using knowledge of which switch port they are received. Therefore, even if a system is in error and supplies the wrong source address, the switch corrects the error and ultimately keeps the response packet from being stored in the wrong area of the receiving system's hardware area.

The pacing of packets through the switch is controlled by having the sending hardware of each switch port keep track of the number of empty packet buffers in the receiving hardware of the system port. In other words, if the system receiving hardware has m packet buffers, the switch sending hardware can send up to m packets without receiving a low level acknowledge from the system receiving hardware. The switch sending hardware must then wait to receive a low level acknowledge from the system before it can send another packet.

There are no packet buffers needed in the receiving hardware of the switch ports, and there is only enough buffering as is required to store the packet before the switch matrix connection is made. Each time the switch receives a packet, it waits until it can send it through the switch matrix to the destination port before it generates a low level acknowledge back to the sending hardware of the source system. If the switch finds that the destination port's m receiving packet buffers are all full, it sends a low level busy acknowledge back to the source. This keeps packets from being stored in the switch ports and allows the source port in the system to try sending a packet to another destination before retrying the packet that was rejected because of busy conditions. Temporarily storing packets in the switch port complicates recovery when a destination port stays busy for a long time.

Packet buffers can be added in the receiving hardware of the switch, and the addition of these buffers may improve the performance. One of the requirements when adding buffers is the ability of the sending hardware in the systems to control these buffers. When the sending hardware in the system detects that an operation has timed out and did not complete, it must be able to examine the state of the added buffers in the receiving hardware of the switch to determine if the message is lingering in the switch. If it is, there must also be a mechanism of purging the message before the operation is retried.

There are situations when a system wants to send a message to itself. One example of this is when multiple operating systems are sharing a single system. When messages are sent, the system port can recognize that the destination address is its own and route the message directly to its own hardware area buffers. In another implementation, the message could be sent to the switch, and the switch could route the message back to the system.

Referring now to FIG. 3, in a preferred embodiment, system (A) communicates with system (C) through the following steps. A high level (program) instruction to move a message is decoded by a Processor (A) at block 30. In block 32, hardware and or licode of Processor A constructs the packet to be sent, and obtains the destination HSA address from the HSA system configuration table 22 relating to system C in block 24.

The packet is then forwarded via system A send Port 12 to system C receive Port 12 via switch 10 in block 36. System C's receive port stores the packet in HSA 18 at the address designated in the packet; i.e., SYS A area (block 38). Upon receipt of an associated storage ack, System C's send port forwards the ack over the link back to System A at block 40.

Recognition of this event is used by Processor A licode as a checkpoint after which it begins awaiting receipt of a higher level response packet from System C. Processor C is interrupted by its receive Port, directly by the setting of an interrupt request latch or indirectly by the receive Port storing data into HSA, which the Processor C has been polling, upon the arrival in its HSA of the packet sent from System A. At block 42, Processor C executes a high level program instruction to move the received packet from HSA to PSA for program processing. A subsequent program C acknowledgement/response to the message received from System A is formulated and a high level program instruction is decoded by Processor C to move it to System A. Hardware and/or licode of Processor C constructs the packet to be sent (block 44) including destination HSA address obtained from the local HSA system configuration table entry relating to System A (block 46). The packet is then forwarded via System C send Port to System A receive Port at block 48.

At block 50, system A's receive Port stores the packet in its HSA at the address designated in the packet (System C) and upon receipt of the associated storage ack, forwards the ack over the link back to System C (block 52). System C receive Port recognizes the ack. Recognition of this event is used by Processor C licode as signalling completion of the send response instruction.

Processor A licode detects the arrival of the program response packet by sensing its receive Port has stored into the HSA location it has been polling. Processor A then moves the response packet from HSA to PSA and ends the send instruction, block 54.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for transferring data between central processor complexes that are interconnected in a network where each central processor complex comprises a processor, a main memory, and a port for sending and receiving data, said method including the steps of:

partitioning said main memory of each central processor complex into a program system area and a hardware system area;

assigning a system address space in said hardware system area of each central processor complex for each other central processor complex connected via said network;

establishing an address table link for each central processor complex linking an address in said system address space assigned in said assigning step to a central processor complex;

assembling data to be transmitted from one central processor complex to another central processor complex with an address to store said data in said hardware system area in said another central processor complex assigned to said one central processor complex; and transmitting said data from said one central processor complex to said another central processor complex.

2. A method as in claim 1 wherein said program system area is addressable by said system operating program, and said hardware system area is not addressable by said system operating program.

3. A method as in claim 1 wherein said data is assembled into packets.

4. A method as in claim 1 wherein said another central processor complex stores said data in its said main memory assigned to said one central processor complex and transmits an acknowledge message to said one central processor complex.

5. A method as in claim 2 wherein said another central processor complex stores said data in its said hardware system area assigned to said one central processor complex and transmits an acknowledge message to said one central processor complex.

6. A method for transferring data between central processor complexes that are interconnected in a network where each central processor complex comprises a processor, a main memory, and a port for sending and receiving data, said method including the steps of:

partitioning said main memory of each central processor complex into a program system area and a hardware system area;

assigning a system address space in said hardware system area of each central processor complex for each other central processor complex connected via said network;

establishing an address table link for each central processor complex linking an address in said system address space assigned in said assigning step to a central processor complex;

assembling data to be transmitted from one central processor complex to another central processor complex with an address to store said data in said hardware system area in said another central processor complex assigned to said one central processor complex; and transmitting said data from said one central processor complex to said another central processor complex.

7. A method as in claim 6 wherein said data is assembled into packets.

8. A method as in claim 6 wherein said another central processor complex stores said data in its said main memory assigned to said one central processor complex and transmits an acknowledge message to said one central processor complex.

9. A method as in claim 6 wherein said network includes a data switch that selectively interconnects each central processor complex in the network with each other central processor in the network, and said transmitting step includes the further step of transmitting said data via said data switch with said data switch coupling data from said central processor complex addressed to said another central processor complex only in response to an acknowledge response from said another central processor complex.

10. A method as in claim 9 wherein said data is assembled into packets.

* * * * *